United States Patent [19]
Schmitt

[11] Patent Number: 5,823,462
[45] Date of Patent: Oct. 20, 1998

[54] EXCHANGE DEVICE FOR REPLACING TRANSPORT BELTS IN A WEB PRODUCING MACHINE

[75] Inventor: Anton Schmitt, Heidenheim, Germany

[73] Assignee: Voith Sulzer Papiermaschinen GmbH, Heidenheim, Germany

[21] Appl. No.: 790,311

[22] Filed: Jan. 28, 1997

[30] Foreign Application Priority Data

Jan. 29, 1996 [DE] Germany .................. 196 03 029.3

[51] Int. Cl.⁶ ............................................. B65H 19/22
[52] U.S. Cl. .................................................. 242/533.8
[58] Field of Search ........................... 242/533, 533.7, 242/533.8, 558, 559, 560

[56] References Cited

U.S. PATENT DOCUMENTS 4,735,373   4/1988   Wozniak ............................. 242/533

FOREIGN PATENT DOCUMENTS

| 37233 | 3/1965 | Germany . |
| 1225549 | 9/1966 | Germany . |
| 2936967 | 4/1981 | Germany . |
| 29601434 | 4/1996 | Germany . |

*Primary Examiner*—John P. Darling
*Attorney, Agent, or Firm*—Greenblum & Bernstein, P.L.C.

[57] ABSTRACT

An exchange device for replacing an old transport belt in, e.g., a dryer section of a machine producing a web, e.g., paper or cardboard. The device may include a spooler for simultaneously removing the old transport belt and inserting new transport belt. The exchange device may also include a mobile carrier device that supports the spooler and may guide the spooler to an exchange location within the web production machine.

25 Claims, 3 Drawing Sheets

EXCHANGE DEVICE FOR REPLACING TRANSPORT BELTS IN A WEB PRODUCING MACHINE

CROSS-REFERENCE OF RELATED APPLICATION

The present invention claims the priority under 35 U.S.C. §119 of German Patent Application No. 196 03 029.3 filed on Jan. 29, 1996, the disclosure of which is expressly incorporated by reference herein in its entirety.

BACKGROUND OF THE INVENTION

1. Field of the Invention

The present invention may relate to an exchange device for a transport belt used, e.g., within a dryer section of a machine for producing of a web of material, e.g., paper or cardboard. The exchange device may include a spooler for removing a used transport belt and for inserting a new transport belt. The spooler may be supported by a mobile carrier device which may be moved to a predetermined location for the transport belt exchange.

The present invention may also be directed to a method for exchanging a used transport belt, e.g., in the dryer section of a machine for the production of a paper or cardboard web, for a new transport belt.

2. Discussion of Background Information

Exchange devices are generally utilized in the prior art. These devices are used in, for example, paper or cardboard production machines to enable exchanging of a transport belt, e.g., dryer screen or felt. At certain locations within the paper production machine, special foundations have been installed on which the exchange device is mounted to enable exchange the transport belt or the felt. The space requirements for such prior art exchange devices is relatively large. Further, it is expensive to install such exchange device foundations within the paper production machine.

SUMMARY OF THE INVENTION

For this reason, it is an object of the present invention to provide an exchange device for a transport belt, and a method for exchanging transport belts of the type discussed above, that does not suffer from the above-noted disadvantages.

Accordingly, the present invention may be directed to an exchange device for a transport belt utilized in, e.g., a dryer section of a machine for the production of a web of material. The exchange device may include a spooler that removes a used transport belt and that inserts a new transport belt. The spooler may be supported by a mobile carrier device that moves the spooler to a predetermined location for exchanging the transport belt. This particular arrangement obviates the need for a separate installation to serve the exchange device within the machine using the transport belt. Thus, the machine according to the present invention may be constructed to use up less space and be more cost efficient than the prior art devices.

In a particular embodiment of the present invention, an exchange device may include a carrier device having at least two carrier elements that can be shifted relative to each other. Thus, the carrier device may be constructed rather simply. One of the at least two carrier elements may be guided into the machine and anchored. This one carrier element may serve as a guide for a second of the at least two elements which may also be anchored in the machine. The at least two carrier elements may be utilized as a base for the spooler.

The present invention may also be directed to a method for exchanging a transport belt in a web production machine including spooler that removes a used transport belt and that inserts a new transport belt. The spooler may be supported by a roller device that moves the spooler to a predetermined location for exchanging the transport belt. The method may include moving a carrier device to a predetermined location for the transport belt exchange, moving the carrier device into the web production machine, moving the spooler into the machine by the roller device, rolling up the used transport belt, and inserting the new transport belt. Because the carrier device may be brought to a predetermined site where the transport belt exchange is to occur, foundations specifically dedicated to an exchange device within the web production machine are no longer necessary. Thus, according to the present invention, the spooler may be guided into the machine to roll up the used transport belt, and to install a new transport belt in the machine.

According to a preferred method, during the rolling up of the used transport belt, the new transport belt may be simultaneously rolled out and threaded in the machine by the used transport belt.

Accordingly, the present invention may be directed to an exchange device for replacing a transport belt in a dryer section of a web production machine. The exchange device may include a spooler device that removes a used transport belt and inserts a new transport belt and a mobile carrier device, supporting the spooler, movable to an exchange location for replacing the transport belt exchange.

In accordance with another feature of the present invention, the spooler and the mobile carrier device may be movable relative to each other.

In accordance with still another feature of the present invention, the spooler may move along a portion of the mobile carrier device.

In accordance with a further feature of the present invention, the exchange device may also include a roller device associated with the spooler.

In accordance with a still further feature of the present invention, the roller device may vary in height with respect to the mobile carrier device.

In accordance with another feature of the present invention, the mobile carrier device may include at least two carrier elements that are movable relative to each other.

In accordance with still another feature of the present invention, at least one of the at least two carrier elements may include at least two carriers.

In accordance with yet another feature of the present invention, the mobile carrier device may include at least one carrier guide device permitting the relative movement of the carrier elements.

In accordance with still another feature of the present invention, the carrier guide device may include at least one roll and at least one rail. The at least one roll may move along the at least one rail.

In accordance with a further feature of the present invention, the spooler may include at least one spooler guide device.

In accordance with another feature of the present invention, the spooler guide device may be associated with the at least one carrier guide device.

The present invention may also be directed to a procedure for exchanging an old transport belt for a new transport belt in a dryer section of a web production machine. The procedure may include moving a carrier device to an exchange location adjacent the web production machine, extending the carrier device into the web production machine, guiding, via a roller device, a spooler into the web production machine, rolling up of the old transport belt, and inserting the new transport belt.

In accordance with another feature of the present invention, extending the carrier device may include extending at least one carrier element into the web production machine.

In accordance with a further feature of the present invention, the process may further include guiding a second carrier element into the web production machine along the first carrier element.

In accordance with still another feature of the present invention, the procedure may include relaxing the old transport belt and placing the relaxed old transport belt on a surface of the extended carrier device.

In accordance with a still further feature of the present invention, the guiding of the spooler may include coupling the spooler to the roller device and rolling the rolling device along a surface of the carrier device.

In accordance with yet another feature of the present invention, the procedure may further include relaxing the tension in the old transport belt, ripping open a seam in the old transport belt, and connecting each end of the old transport belt to the spooler.

In accordance with another feature of the present invention, the procedure may also include simultaneously rolling up the old transport belt and unrolling the new transport belt. The simultaneous rolling and unrolling may thread the new transport belt in the web production machine.

The present invention may also be directed to a device for replacing an old transport belt in a web production machine. The device may include a spooler device for simultaneously removing the old transport belt and threading a new transport belt in the web production machine and a carrier device for positioning the spooler device at a predetermined exchange location within the web production machine.

In accordance with a further feature of the present invention, the carrier may include at least a first and second carrier element telescopically movable relative to each other. The spooler device may traverse an extent of the first carrier element.

In accordance with another feature of the present invention, the first carrier device and the spooler may be located on opposite sides of the old transport belt.

In accordance with still another feature of the present invention, a roller device may move the spooler device perpendicular to a surface of the carrier device.

In accordance with a still further feature of the present invention, the carrier device may include at least two guides and the spooler device may include at least two rolls. The at least two rolls and at least two guides may couple the carrier device and the spooler device.

In accordance with a further feature of the present invention, the carrier device may include at least a first and second carrier element movable relative to each other, a first drive device for extending one of the first and second carrier element into the web production machine, and a second drive device for extending an other of the first and second carrier element into the web production machine. The other carrier element may be guided by the one carrier element.

In accordance with another feature of the present invention, the device may include a device for anchoring the one carrier element after extension into the web production machine, a device for anchoring the other carrier element after extension into the web production machine, and a roller device for moving the spooler along a surface of one of the first and second carrier element and into the web production machine.

In accordance with still another feature of the present invention, the device may also include a device for ripping a seam in the old transport belt. The spooler may include a first winding reel, containing the new transport belt, and a second winding reel. A coupling element may couple a first end of the ripped old transport belt to an end of the new transport belt and a coupling element coupling the second end of the ripped old transport belt to the second winding reel.

In accordance with yet another feature of the present invention, the device may include a reel driver driving at least the second winding reel to remove the old transport belt and to thread the new transport belt.

Further embodiments and advantages can be seen from the detailed description of the present invention and the accompanying figures.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the several forms of the invention may be embodied in practice.

An exchange device as described herein may be utilized in, e.g., a web production machine in which the web, e.g., paper or cardboard, may be formed and guided therethrough. To guide the web through the machine, transport belts, e.g., screen belts or felts, may be utilized to carry the web in a meandering (winding) path across and around dryer cylinders and guide rolls.

Figure 1:
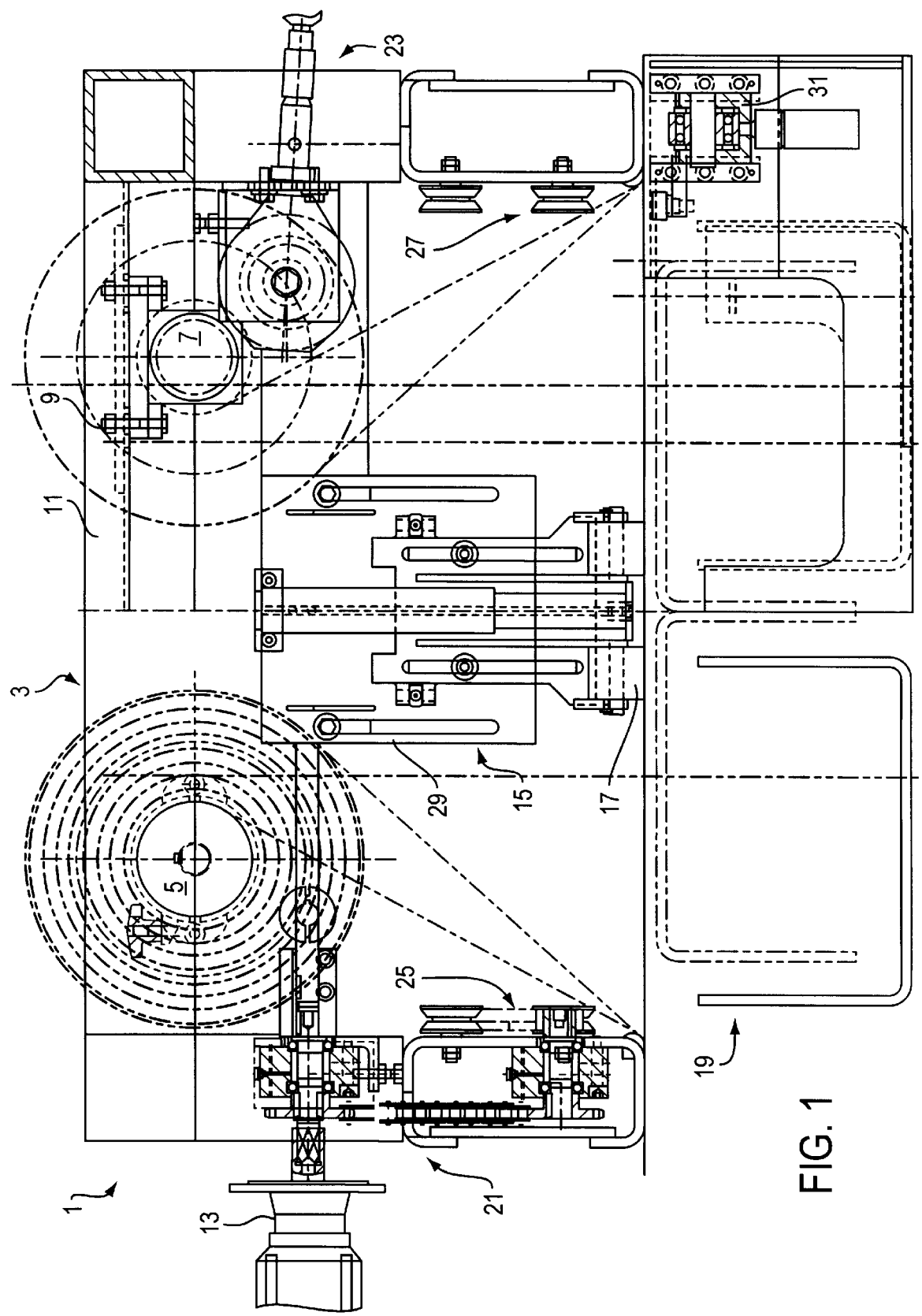
FIG. 1 illustrates a schematic lateral view of an exchange device in working position.

Exchange device 1, as shown in FIG. 1, may include a spooler 3 comprising two winding shafts 5 and 7. On a first winding shaft, e.g., winding shaft 5, a new rolled transport belt may be located at a position designated as a beginning of the transport belt exchange. A second winding shaft, e.g., winding shaft 7, may be initially empty and utilized to receive the used (replaced) transport belt.

Each winding shaft 5 and 7 may be attached by a suitable bearing 9 to an essentially U-shaped carrying frame 11 and coupled to a respective suitable drive 13 and 13'. It is conceivable that only one of the winding shafts may be provided with a drive. In this manner, the drive may be used to pull the used transport belt from the paper production machine and simultaneously roll off a new transport belt for the machine.

A roller device 15, which may include suitable rolls 17, may be rollably supported on a carrier device 19 and effect movement of carrier frame 11.

The device may include at least two carrier arms 21 and 23. Guide devices 25 and 27 may be provided on carrier arms 21 and 23 of spooler 3. Guide devices 25 and 27 may include rolls, that, as more fully described below, may work in conjunction with guide devices associated with carrier device 19.

Roller device 15 may be variably adjustable with respect to height, i.e., in a direction parallel to the slots 17a, 17b, 29a, 29b in roll device 15. Roller device 15 may also include rolls 17 which may be rolled in a direction relative to a base 29 of the roll device 15, i.e., guided by slots 17a, 17b. In this manner, spooler 3, which may be supported by roller device 15, may be raised or lowered with respect to rolls 17.

At a predetermined location within the paper production machine, i.e., where the transport belt exchange is to occur, a stabilizer device 31 may be provided which prevents a jamming of spooler 3.

Figure 2:
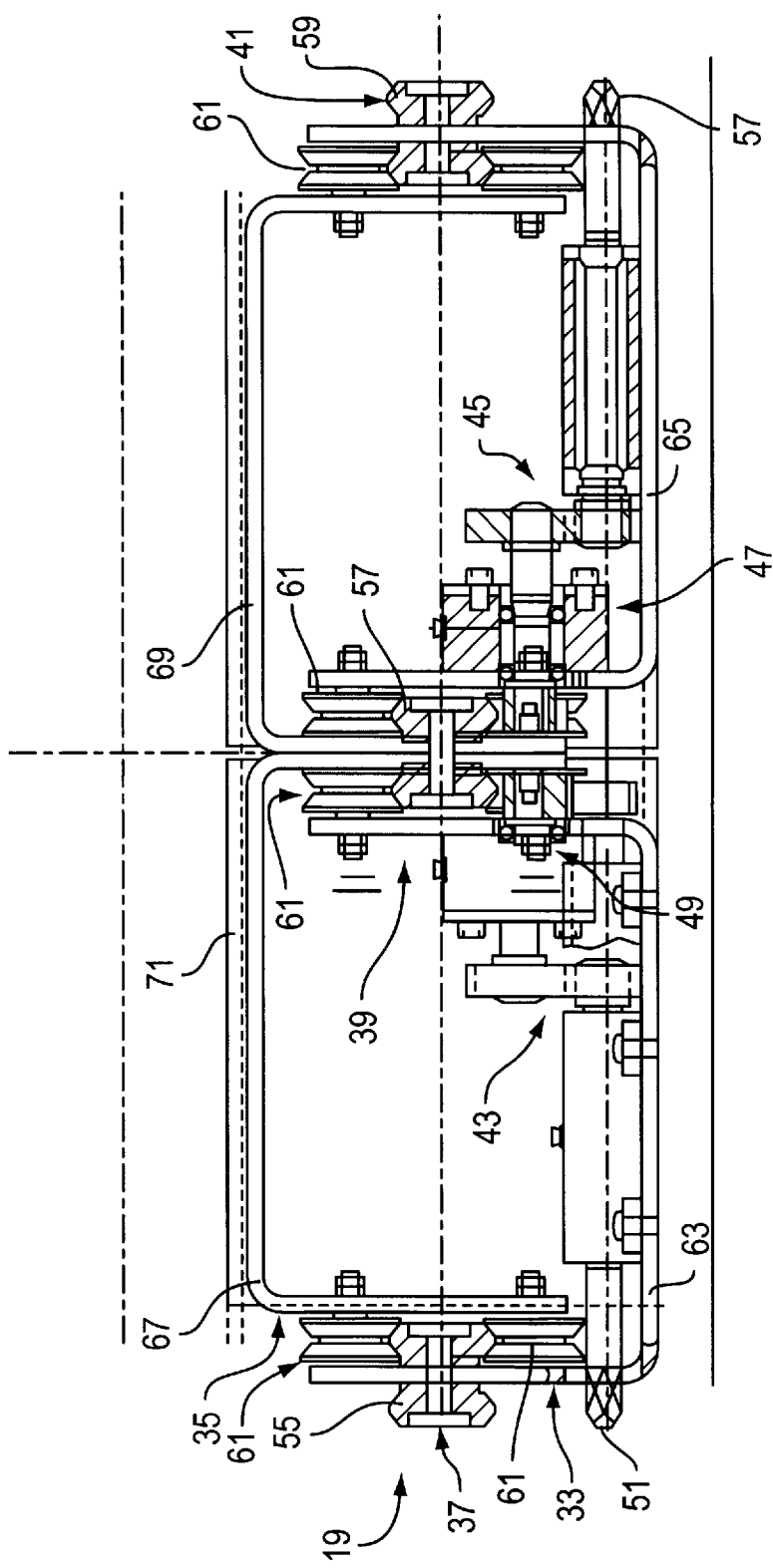
FIG. 2 illustrates a part of the exchange device shown in FIG. 1.

As shown in FIG. 2, a carrier device 19 may include two parts. For example, carrier device 19 may include a first, e.g., lower carrier element 33 and a second, e.g., upper carrier element 35. The length of carrier device 19 may be, e.g., sufficiently long to extend across an entire width of the paper production machine run or the width of the transport belt. When the exchange of the transport belt begins, exchange device 1 and carrier device 19 may be brought (guided) to an exchange location and placed adjacent to the transport belt to be exchanged and perpendicular to the transport belt running direction. Carrier elements 33 and 35, shown from an end view of the elements in a longitudinal direction of carrier device 19, may be longitudinally shifted relative to each other through suitable guide devices 37, 39 and 41. For example, carrier element 35 may be extended (rolled) into the paper production machine, i.e., beneath an underside of the transport belt to be changed, and locked in place (anchored). Then, carrier element 33 may be extended (rolled) into the paper production machine under the guidance of carrier element 35 and locked in place. As shown in FIG. 2, carrier elements 33 and 35 may be provided with a driver 43, 45 in order to simplify the shifting or extending of the carrier elements into the paper production machine. Respective drivers 43, 45 may include drive devices 47 and 49 and/or shaft stumps 51 and 53 which may be attached to a suitable driver.

Guide devices 37, 39 and 41 may include rails 55, 57 and 59, respectively, that may extend along an entire length of carrier device 19. Guide devices 37, 39, and 41 may also include a plurality of roll pairs 61. Each roll in roll pair 61 may be disposed on opposing sides of rails 55, 57, and 59, i.e., an upper and lower side, the upper and lower side designated with respect to the upper and lower carrier. This arrangement may be utilized to ensure optimal guidance and stabilization of carrier elements 33 and 35 relative to each other. Each roll of roll pair 61 may include a substantially V-shaped indentation formed within its circumference to receive a complementarily formed protrusion of a respective rail. Accordingly, guidance in the lengthwise direction of carrier device 19 may be ensured and cross-wise shifting of the carrier elements relative to each other may be effectively prevented. Thus, the above-discussed arrangement of the present invention stabilizes carrier device 19 throughout its extension and subsequent retraction from the web production machine.

Rails 55 and 59 may extend beyond the side lateral walls of carrier device 19. These rails may be utilized in conjunction with rolls associated with guide devices 25 and 27 formed on an inside surface of carrier arms 21 and 23 of the carrier frame 11.

Figure 3:
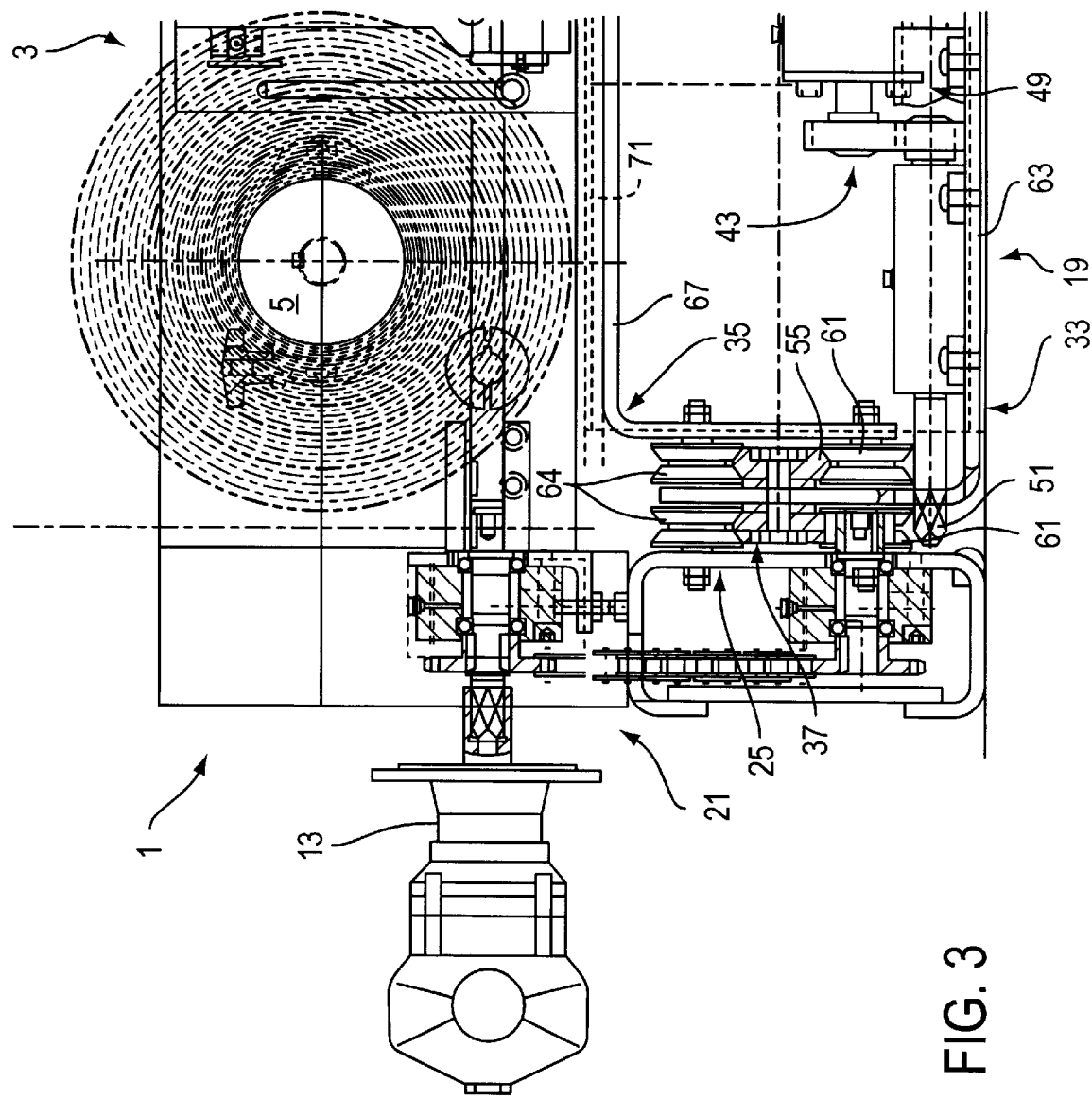
FIG. 3 illustrates a part of the exchange device in resting position.

Referring now to FIG. 3 only a left half of exchange device 1 is shown. Exchange device 1 may be compactly arranged when spooler 3 is located directly on top of carrier device 19. In this arrangement, guide devices 25 and 27 may engage rails 55 and 59 of carrier device 19. This position of spooler 3 and carrier device 19 may be selected when exchange device 1 is not in operation. To arrange the spooler atop carrier device 19, rolls 17 may be guided via slots 17a, 17b and rolled completely into base 29 of roller device 15 and base 29 may be returned completely into its top most starting position via slots 29a, 29b. By comparing FIGS. 1 and 3, it is apparent that, in FIG. 1, base 29 is set in a lowest working position, i.e., most extended position, while, in FIG. 3, base 29 is arranged in its most compressed arrangement.

Upper carrier element 35 may be constructed of, e.g., two U-shaped carriers 67 and 69, and U-shaped carriers 67 and 69 may be arranged such that their respective inner legs are coupled together. Lower carrier element 33 may be constructed of, e.g., two U-shaped carriers 63 and 65. As shown in FIG. 2, guide devices 37 and 41 may be mounted to outer legs of U-shaped carriers 63 and 65, respectively, and guide device 39 may be mounted to inner legs of U-shaped carriers 67 and 69. Roll pairs 61 may be mounted on an outer leg of U-shaped carriers 67 and 69 to run along guide devices 37 and 41, respectively, and roll pairs 61 may be mounted on inner legs of U-shaped carriers 63 and 65 to run along guide device 39. The engagement of the U-shaped carrier legs and guide devices provide a relatively light but highly stable carrier device 19. Atop the upper surface of carriers 67 and 69, the present invention may include a support surface, e.g., a needle or nail board 71, to be more fully discussed below. Further, rolls 17 of roller device 15 may be utilized to roll along the longitudinal direction of carriers 67 and 69. Accordingly, spooler 3 may be moved or oriented in any desired longitudinal direction relative to carrier device 19.

In accordance with the present invention, a description of an exemplary method or procedure for exchanging a transport belt within a paper or cardboard production machine will now be provided. For example, exchange device 1 may be stored in its compressed state, i.e., in a rest position, in an arrangement similar to that depicted in FIG. 3.

In the off position, exchange device 1 may be used for rewinding or off winding of new and old transport belts or felts. That is, if winding shaft 5 is empty, new transport belt material may be loaded onto the shaft; if winding shaft 7 is full, the old transport belt material may be unrolled from the shaft. This off position is of particular importance when the paper side is supposed to be reversed.

When exchanging a transport belt or felt within a paper production machine, carrier device 19 may be guided to a predetermined exchange location and adjacent the existing transport belt to be replaced and positioned perpendicular to the paper production machine run, i.e., perpendicular to the running direction of the transport belt. A first carrier element, e.g., lower carrier element 33, may be telescopically extended about halfway into the paper production machine run, e.g., below the felt run. Then lower carrier 33 and upper carrier 35 may be concurrently extended into the paper production machine until the entire extent of lower carrier 33 has been extended. Once fully extended, lower carrier 33 may be firmly anchored on its opposite side, e.g., on a drive side. Upper carrier element 35 may now be fully extended and inserted into the paper production machine. Each carrier elements 33 and 35 may be securely guided into the paper production machine relative to each other along guide devices 37, 39 and 41. Upon full extension, upper carrier element 35 may also be fastened in the paper production machine. Alternatively, the upper and lower carrier elements may be reversed such that the upper carrier is first extended into the machine.

By extending and anchoring upper and lower carrier elements 35 and 33, a secure base may be provide on which spooler 3 may be moved into the paper production machine. However, before spooler 3 may be inserted, the felt or transport belt to be exchanged should be relaxed to such an extent that the transport belt rests atop the base of the carriers 67 and 69. Spooler 3 may be moved into the paper production machine, e.g., above the felt or transport belt relative to the carrier device 19 positioned below the felt. The insertion of spooler 3 may be greatly simplified by utilizing roller device 15. Specifically, rolls 17 may be used to longitudinally roll out spooler 3 along carriers 67 and 69 and carrier arm 11 with the possible stabilization device 31 may be raised.

After spooler 3 is fully extended (inserted) into the paper production machine, roller device 15 may be moved, via rolls 17, so that carrier frame 11 of the spooler 3 may rest upon suitable abutments of stabilizing device 31.

As noted above, a nail board 71 may be mounted atop carriers 67 and 69. Nail board 71 may be utilized for fastening the felt running across the carrier device 19 and may provide a safe and secure retention of the felt until the exchange procedure begins.

Once the felt is secured to nail board 71, the felt may be ripped, in a known manner, e.g., along an existing seam extending perpendicularly across the width of the paper production machine run. Preferably, the existing seam may be placed adjacent a middle portion of the carrier device 19, e.g., where carriers 67 and 69 are joined together. The respective ends of the ripped felt may be connected to respective winding shafts of exchange device 1. For example, a right-hand portion of the ripped felt may be coupled to winding shaft 7, which may be initially empty and a left-hand portion of the ripped felt may be coupled to winding shaft 5, or more specifically, coupled to an end of the new felt or transport belt to be inserted. Thus, at this point in the insertion process, the new felt on winding shaft 5 may be coupled to the old felt which meanders or winds through the web production machine and may be coupled, at its opposite end, to the empty winding shaft 7. Drive 13', which may include, e.g., a chain drive, may actuate empty winding shaft to rotate, i.e., to begin winding up the old felt or transport belt by pulling the belt out of the production machine. Because the end of the old felt, i.e., opposite winding shaft 7, is coupled to the new felt, the new felt is simultaneously threaded into place as the old belt is removed from the production machine.

As soon as the old transport belt is fully wound up on, e.g., winding shaft 7, and the new transport belt has been threaded into the paper production machine, the ends of the new transport belt may be joined to each other in a conventional manner. Exchange device 1 may include a device that securely joins the ends of the new felt in the running direction. It may also be possible to slacken the ends of the transport belt by shifting, in the direction of the seam, to ease the joining. As spooler 3 sits on rolls 17, the lateral edges of the transport belt can be precisely adjusted towards each other.

After the ends of the transport belt have been joined, roller device 15 may be, e.g., used again (assuming sufficient new felt remains on winding shaft) in a similar manner. However, roller device 15 should also be retracted from the web production device via rolls 17. Thus, roller device 15 may be removed from the machine such that spooler 3 may be freely arranged on the base formed by carriers 67 and 69, and may be moved out to carrier device 19.

Once spooler 3 has been retracted out of the web production machine, carrier elements 33 and 35 may be loosened and retracted or moved out of the paper production machine.

For storing exchange device 1 and for transporting exchange device 1 to respective exchange locations within the paper production machine, spooler 3 and carrier device 19 may be preferably pushed on top of each other, i.e., in the compressed arrangement, as explained in FIG. 3. Thus, exchange device 1 would exhibit its most compact and space saving structure.

In view of the foregoing discussion of the exchange device or the disclosed procedure for exchanging a transport belt, an exchange device for a fixed carrier mounted in the paper production machine, as required by the prior art, may be eliminated. Further, considerable space savings and reduced construction costs may be realized. The construction and arrangement of the exchange device may relatively simple and easy to use. Consequently, the exchange procedure, as disclosed above, may likewise be simple to execute. As carrier elements 33 and 35 of carrier device 19 provide for stable and secure guidance of each other, these elements also provide for stable and secure movement of spooler 3 along carrier device 19. Thus, the danger of accidents, compared to conventional procedures, is greatly reduced.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. An exchange device for replacing a transport belt in a dryer section of a web production machine, comprising:
   a spooler device that removes a used transport belt and inserts a new transport belt;
   a mobile carrier device, supporting the spooler device, movable to an exchange location for replacing the transport belt; and
   the spooler device being movable along a portion of the mobile carrier device.

2. The exchange device according to claim 1, the spooler device and the mobile carrier device are movable relative to each other.

3. The exchange device according to claim 1, further comprising a roller device associated with the spooler device.

4. The exchange device according to claim 3, the roller device varying in height with respect to the mobile carrier device.

5. The exchange device according to claim 1, the mobile carrier device comprising at least two carrier elements that are movable relative to each other.

6. The exchange device according to claim 5, at least one of the at least two carrier elements comprising at least two carriers.

7. The exchange device according to claim 5, the mobile carrier device comprising at least one carrier guide device permitting the relative movement of the carrier elements.

8. The exchange device according to claim 7, the carrier guide device comprising at least one roll and at least one rail, the at least one roll moving along the at least one rail.

9. The exchange device according to claim 8, the spooler device comprising at least one spooler guide device.

10. The exchange device according to claim 9, the spooler guide device being associated with the at least one carrier guide device.

11. A procedure for exchanging an old transport belt for a new transport belt in a dryer section of a web production machine comprising:

moving a carrier device to an exchange location adjacent the web production machine;

extending the carrier device into the web production machine;

guiding, via a roller device, a spooler into the web production machine;

rolling up the old transport belt; and inserting the new transport belt.

12. The procedure according to claim 11, wherein the carrier device comprises at least one carrier element, and the extending of the carrier device comprises extending the at least one carrier element into the web production machine.

13. The procedure according to claim 12, further comprising guiding a second carrier element into the web production machine along the first carrier element.

14. The procedure according to claim 11, further comprising:

relaxing the old transport belt; and placing the relaxed old transport belt on a surface of the extended carrier device.

15. The procedure according to claim 11, the guiding of the spooler comprising:

coupling the spooler to the roller device; and rolling the rolling device along a surface of the carrier device.

16. The procedure according to claim 11, further comprising:

relaxing the tension in the old transport belt;

ripping open a seam in the old transport belt; and connecting each end of the old transport belt to the spooler.

17. The procedure according to claim 11, further comprising:

simultaneously rolling up the old transport belt and unrolling the new transport belt, the simultaneous rolling and unrolling threading the new transport belt in the web production machine.

18. A device for replacing an old transport belt in a web production machine comprising:

a spooler device for simultaneously removing the old transport belt and threading a new transport belt in the web production machine;

a carrier device for positioning the spooler device at a predetermined exchange location within the web production machine;

said carrier comprising at least a first and second carrier element telescopically movable relative to each other; and said spooler device traversing an extent of the first carrier element.

19. The device according to claim 18, said first carrier device and said spooler device located on opposite sides of the old transport belt.

20. The device according to claim 18, further comprising a roller device, said roller device moving said spooler device perpendicular to a surface of said carrier device.

21. The device according to claim 20, said carrier device comprising at least two guides and said spooler device comprising at least two rolls, said at least two rolls and at least two guides coupling said carrier device and said spooler device.

22. The device according to claim 18, said carrier device comprising at least a first and second carrier element movable relative to each other;

a first drive device for extending one of said first and second carrier elements into said web production machine;

a second drive device for extending an other of the first and second carrier elements into said web production machine;

said other carrier element guided by said one carrier element.

23. The device according to claim 22, further comprising:

a device for anchoring said one carrier element after extension into the web production machine;

a device for anchoring said other carrier element after extension into the web production machine;

a roller device for moving said spooler device along a surface of one of said first and second carrier element and into said web production machine.

24. The device according to claim 18, further comprising:

a device for ripping a seam in the old transport belt;

said spooler device comprising a first winding reel and a second winding reel, said first winding reel comprising the new transport belt;

a coupling element coupling a first end of the ripped old transport belt to an end of the new transport belt and a coupling element coupling said second end of the ripped old transport belt to said second winding reel.

25. The device according to claim 24, further comprising:

a reel driver driving at least said second winding reel to remove the old transport belt and to thread the new transport belt.

* * * * *